(No Model.)
J. H. GATELEY.
CIRCULAR SAWING MACHINE.
No. 487,947.  Patented Dec. 13, 1892.
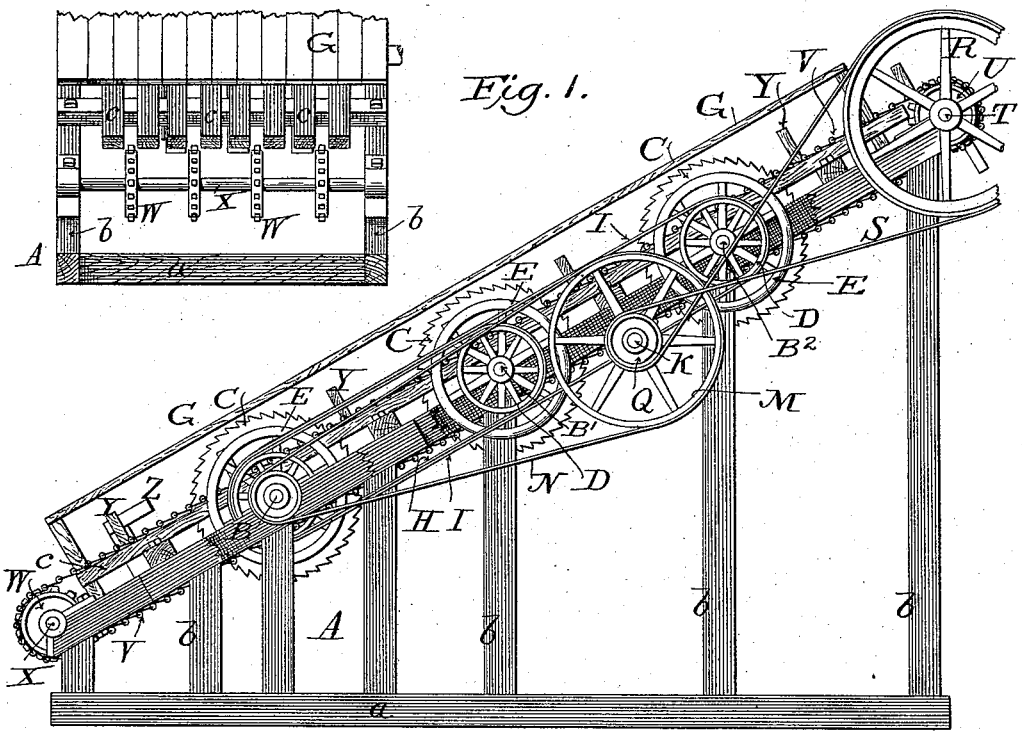
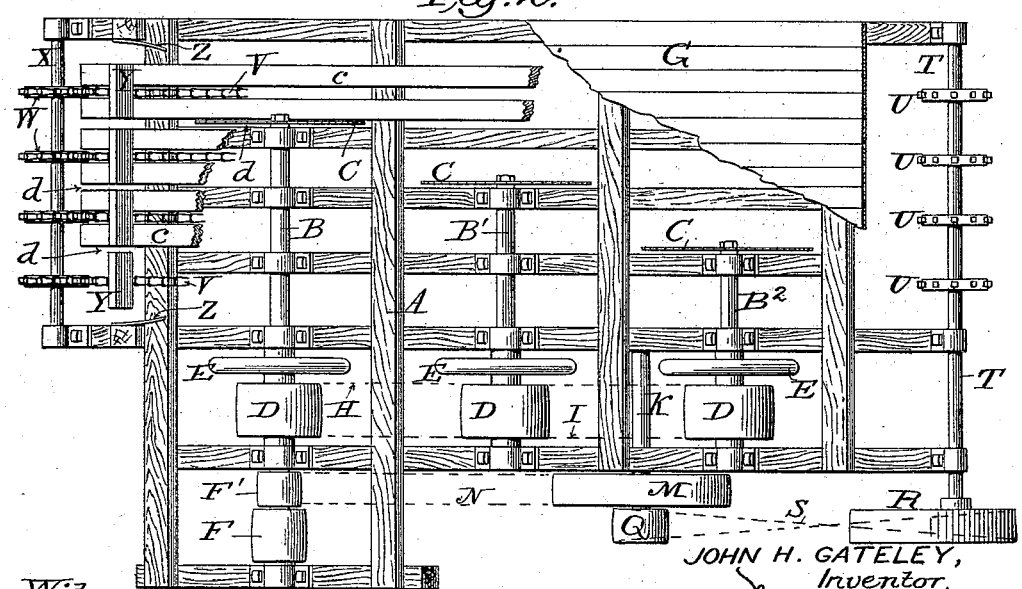
JOHN H. GATELEY, Inventor,
BY Dodge & Sons,
his Attys.
Witness:
James F. Duhamel
Horace A. Dodge.

UNITED STATES PATENT OFFICE.

JOHN H. GATELEY, OF JANESVILLE, WISCONSIN.

CIRCULAR SAWING MACHINE.

SPECIFICATION forming part of Letters Patent No. 487,947, dated December 13, 1892.

Application filed June 4, 1892. Serial No. 435,533. (No model.)

*To all whom it may concern:*

Be it known, that I, JOHN H. GATELEY a citizen of the United States residing at Janesville in the county of Rock and State of Wisconsin have invented certain new and useful Improvements in Circular Sawing Machines of which the following is a specification:

My invention relates to circular sawing machines, and has reference more particularly to that class of machines designed for sawing firewood, although the machine is susceptible of other uses.

In the accompanying drawings,—Figure 1 is a side elevation, partly in section, of my improved machine; Fig. 2, a top plan view partly in section; and Fig. 3, a rear end view of the supporting table.

A indicates the frame of the machine comprising the base or sills $a$, the uprights $b$ and the inclined table $c$.

Extending transversely across the machine are three shafts B, B' and B², each of which is provided at its inner end with a saw C and at its outer end with a band wheel or pulley D, and at a point between the band wheel and the saw is a balance wheel E, as shown in Figs. 1 and 2. The first shaft, or in the present instance, that shaft nearest the feed end of the machine, is made longer than the other shafts and extends nearly across the full width of the table, and is provided at its opposite end beyond the pulley D with band pulleys F and F'. This shaft B may be supported at one or more points in suitable boxes or bearings secured to the longitudinal timbers of the table, which table is provided with a slot $d$ up through which the saw is designed to project. The second shaft B' is made shorter than the first shaft B, and the saw carried by the said shaft B' is set out of line with the first mentioned saw. The third shaft B² is made still shorter so that the saw carried at the end of said shaft shall be out of line with both of the preceding saws. This arrangement may be reversed; that is, the longer shaft may be at the opposite end.

Secured to the table, parallel with the upper face thereof, and above the saws, is a boarding or housing G, which is designed to form a chamber or passage-way through which the wood to be sawed is carried along. This boarding or housing may be located wholly above the top of the saws, or may be provided with slits or openings so as to allow the saws to project upwardly therethrough, as may be preferred.

In order to give the proper rotary motion to the saws, I pass around the pulleys D D, secured upon the shafts B, B', a belt H, while about the pulleys D D, secured to the shafts B and B², I pass a longer belt I, as clearly shown in Figs. 1 and 2. By this means the saw shafts receive a uniform speed of rotation in the same direction.

Motion is imparted to the band wheel F on the shaft B from any convenient source of power. A countershaft K is secured to the frame and provided with a pulley M, from which a belt N passes to the pulley F' secured upon shaft B. Upon this countershaft is also secured a smaller pulley Q, which is connected with a larger pulley R by means of a cross belt S; the said pulley R being mounted upon a shaft T journaled in suitable bearings at the upper end of the table of the machine, as shown in Figs. 1 and 2. This shaft T is provided with a number of sprocket wheels U, in the present instance four in number, about which wheels pass the chains V which pass over similar sprocket wheels W secured to a shaft X at the lower end of the table. These chains V are provided at suitable distances throughout their length with dogs or cross bars Y, which are of a width corresponding to the width between the vertical planes occupied by the different saws. The log or stick to be sawed is placed upon these dogs and the machine set in motion. As the upper sides of the chains advance, the dogs carry the log or stick forwardly up the inclined table until it comes in contact with the first saw which removes a section corresponding approximately in length to the length of the outermost of left-hand dog or bar. As the log or stick is further advanced it meets the second saw and another section is removed, and as the log is still further advanced the remaining section is cut in two by the third saw, all of the sawed pieces being carried over the top or upper end of the inclined table by their respective dogs or cross bars. The chains will be provided with a large number of these dogs or cross bars so that the operation of sawing may be rendered practically continuous.

By the employment of the housing or boarding G, I prevent pieces of wood sawed off from being thrown up back, as is liable to occur where such housing or boarding is not employed.

In order to properly guide and center the log after it is placed upon the dogs, I provide the frame of the machine with spring arms Z which, as shown in Fig. 2, project inwardly toward each other at their upper ends.

If the log should be set too far to one side it will strike against the spring arm and be forced over to the opposite side until it strikes the opposite arm, thereby insuring a greater uniformity in the length of the sawed stuff than where no such device as I have described is employed.

By the arrangement of belting which I have shown, there is practically no slip of the belts on the belt pulleys, the contact of the outer or encircling belt I with the inner belt H giving to the third or uppermost saw the same speed, without any loss of power, as is imparted to the two lower saws.

All the shafts being upon the frame of the machine renders the latter portable.

Having thus described my invention, what I claim is:—

In a circular sawing machine, the combination with a frame or table, of a shaft B at the feed end of the table, extending nearly across the same and provided with a saw; a shaft B' shorter than the shaft B, provided with a saw out of line with the first saw; and a third shaft, B², shorter than the shaft B' and provided with a saw out of line with the second saw, conveying chains working between the saws and between the sides of the table and the saws; means for imparting motion to the shaft B and independent means for imparting motion from said shaft directly to the remaining shafts.

In witness whereof, I hereunto set my hand in the presence of two witnesses.

JOHN H. GATELEY.

Witnesses:
H. H. McKINNEY,
MAUDE L. YOUNG.